US009539865B2

(12) United States Patent
Lakin et al.

(10) Patent No.: US 9,539,865 B2
(45) Date of Patent: Jan. 10, 2017

(54) TIRE INFLATION SYSTEM HAVING A SLEEVE ASSEMBLY FOR ROUTING PRESSURIZED GAS

(71) Applicant: ArvinMeritor Technology, LLC, Troy, MI (US)

(72) Inventors: Nicholas S. Lakin, Rochester Hills, MI (US); Timothy J. Boothby, Troy, MI (US); Kevin Tracy, Warren, MI (US); James G. Polubinski, Fraser, MI (US); Aaron Sinka, Rochester Hills, MI (US); Dale Kwasniewski, Galesburg, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 560 days.

(21) Appl. No.: 14/050,426

(22) Filed: Oct. 10, 2013

(65) Prior Publication Data

US 2015/0101722 A1    Apr. 16, 2015

(51) Int. Cl.
*B60C 23/00* (2006.01)

(52) U.S. Cl.
CPC .................................. *B60C 23/003* (2013.01)

(58) Field of Classification Search
CPC ......... B60C 23/00; B60C 23/003; B60C 23/10
USPC ................................................. 152/415–416
See application file for complete search history.

(56) References Cited

U.S. PATENT DOCUMENTS 4,705,090 A * 11/1987 Bartos ................... B60C 23/003
137/224
4,730,656 A * 3/1988 Goodell ................. B60C 23/003
137/224
4,733,707 A * 3/1988 Goodell ................. B60C 23/003
137/224
5,174,839 A * 12/1992 Schultz ................. B60C 23/003
152/415
5,354,391 A * 10/1994 Goodell ................. B60C 23/003
152/417
5,893,648 A * 4/1999 Smith ....................... F16C 19/34
384/448
6,145,558 A * 11/2000 Schmitz ................ B60C 23/003
152/416
6,363,985 B1 * 4/2002 Beesley ................ B60C 23/003
152/415
6,719,028 B2 * 4/2004 D'Amico .............. B60C 23/003
152/415
6,994,136 B2    2/2006 Stanczak
7,690,412 B1    4/2010 Jenkinson et al.
7,931,061 B2    4/2011 Gonska et al.
8,616,254 B2    12/2013 Kelley et al.
8,915,274 B2 * 12/2014 Eschenburg .......... B60C 23/003
152/416
2011/0133046 A1 * 6/2011 Lemerise ............... G01D 11/30
248/230.8

(Continued)

OTHER PUBLICATIONS

MERITOR an ArvinMeritor brand, Mentor Tire Inflation System (MTIS) by PSI(TM), including Mentor ThermALERT (TM), PB-9999, Revised May 2007.

*Primary Examiner* — Jason Bellinger
(74) *Attorney, Agent, or Firm* — Brooks Kushman P.C.

(57) ABSTRACT

A tire inflation system having a sleeve assembly. The sleeve assembly may be disposed proximate a spindle and may receive pressurized gas. A wheel end seal assembly may be disposed between the sleeve assembly and a hub to help route the pressurized gas.

19 Claims, 2 Drawing Sheets

(56) References Cited

U.S. PATENT DOCUMENTS

| | | |
|---|---|---|
| 2012/0186714 A1 | 7/2012 | Richardson |
| 2012/0234447 A1 | 9/2012 | Narloch et al. |

* cited by examiner

TIRE INFLATION SYSTEM HAVING A SLEEVE ASSEMBLY FOR ROUTING PRESSURIZED GAS

TECHNICAL FIELD

This patent application relates to a tire inflation system having a sleeve assembly for routing pressurized gas.

BACKGROUND

A tire inflation system with an integral wheel seal is disclosed in U.S. Pat. No. 7,931,061.

SUMMARY

In at least one embodiment, a tire inflation system is provided. The tire inflation system may include a conduit, a spindle, a hub, a sleeve assembly, and a wheel end seal assembly. The conduit may supply a pressurized gas for inflating a tire. The hub may be rotatably disposed on the spindle. The hub may have a hub passage that routes the pressurized gas through the hub. The sleeve assembly may be disposed proximate the spindle. The sleeve assembly may have a sleeve assembly passage that receives the pressurized gas from the conduit. The wheel end seal assembly may be disposed between the sleeve assembly and the hub. The wheel end seal assembly may have a seal passage that may fluidly connect the sleeve assembly passage to the hub passage.

In at least one embodiment, a tire inflation system is provided. The tire inflation system may include a conduit, a spindle, a hub, a sleeve assembly, and a wheel end seal assembly. The conduit may supply a pressurized gas for inflating a tire. The spindle may be disposed along an axis. The hub may be disposed on the spindle and may be configured to rotate about the axis. The hub may have a hub passage that may route the pressurized gas through the hub. The sleeve assembly may include a sleeve assembly seal and a deflector. The sleeve assembly seal may have a hole and a sleeve assembly passage. The hole may receive the spindle. The sleeve assembly passage may receive the pressurized gas from the conduit. The deflector may be mounted on the sleeve assembly seal. The wheel end seal assembly may be disposed between the sleeve assembly seal and the hub. The wheel end seal assembly may have a seal passage that may fluidly connect the sleeve assembly passage to the hub passage.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
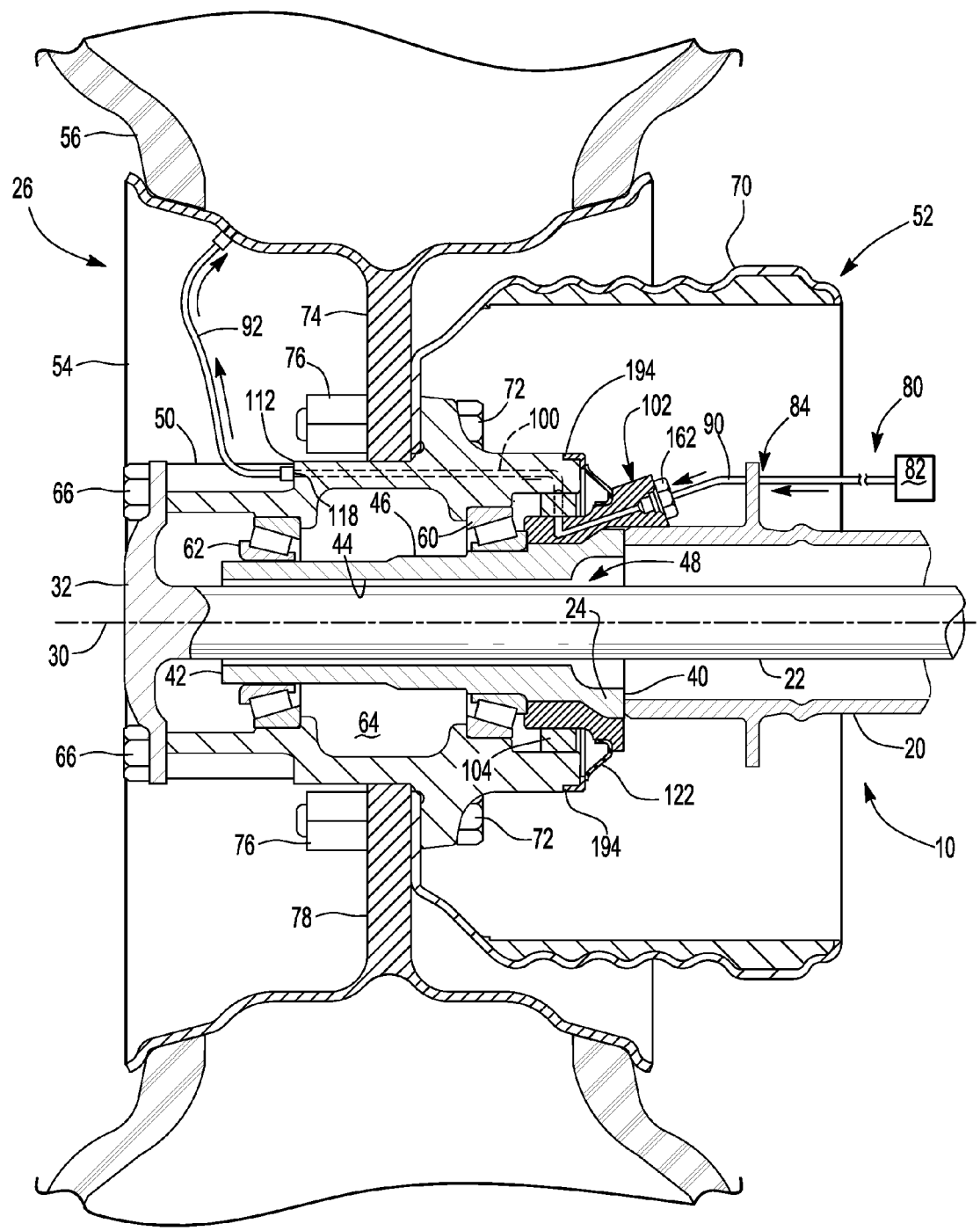
FIG. 1 is a section view of an exemplary wheel end assembly and a tire inflation system.

Referring to FIG. 1, a portion of an exemplary axle assembly 10 is shown. The axle assembly 10 may be provided with a motor vehicle like a truck, bus, farm equipment, military transport or weaponry vehicle, or cargo loading equipment for land, air, or marine vessels or a trailer that may be provided with a motor vehicle.

The axle assembly 10 may be configured as a drive axle that may receive torque from a power source, such as an internal combustion engine or electric motor. Alternatively, the axle assembly 10 may be configured as a non-drive axle in one or more embodiments. The axle assembly 10 may or may not be steerable. In a drive axle configuration, the axle assembly 10 may include an axle housing 20, an axle shaft 22, a spindle 24, and a wheel end assembly 26.

The axle housing 20 may receive various components of the axle assembly 10. In addition, the axle housing 20 may facilitate mounting of the axle assembly 10 to the vehicle. The axle housing 20 may define a cavity that may receive at least a portion of the axle shaft 22.

The axle shaft 22 may provide torque to the wheel end assembly 26 to propel the vehicle. For instance, the axle shaft 22 may be connected at a first end to a vehicle drivetrain component, like a differential or input shaft, and may be coupled to the wheel end assembly 26 at a second end. In at least one embodiment, the axle shaft 22 may extend along and may rotate about an axis 30. Alternatively, the axle shaft 22 may be configured for use with an independent suspension system and may have multiple shaft segments and/or joints, such as constant-velocity joints, that may facilitate relative movement between the first end and the wheel end assembly 26. The axle shaft 22 may include an axle flange 32 disposed at a distal end. The axle flange 32 may facilitate mounting of the wheel end assembly 26 to the axle shaft 22. In a non-drive axle configuration, the axle shaft 22 may be omitted.

The spindle 24 may be provided with or may be fixedly positioned with respect to the axle assembly 10. The spindle 24 may generally extend along but may not rotate about the axis 30. In a drive axle configuration, the spindle 24 may include a first spindle end surface 40, a second spindle end surface 42, an internal surface 44, an external surface 46, and a hole 48. In a non-drive axle configuration, the internal surface 44 and the hole 48 may be omitted. Moreover, in a steerable non-drive axle configuration, the spindle 24 may be provided with or may be fixedly positioned with respect to a steering knuckle rather than the axle housing 20. The first spindle end surface 40 may be disposed proximate or may engage the axle housing 20. The second spindle end surface 42 may be disposed opposite the first spindle end surface 40 and may be located near the axle flange 32. The internal surface 44 may extend between the first spindle end surface 40 and the second spindle end surface 42 and may at least partially define the hole 48 through which the axle shaft 22 may extend. As such, the spindle 24 may be spaced apart from the axle shaft 22 to permit the axle shaft 22 to rotate about the axis 30. The external surface 46 may be disposed opposite the internal surface 44. The external surface 46 of the spindle 24 may support one or more wheel bearings that may rotatably support the wheel end assembly 26 as will be discussed in more detail below.

The wheel end assembly 26 may be rotatably coupled to the axle shaft 22. The wheel end assembly 26 may include a hub 50, a brake subsystem 52, a wheel 54, and a tire 56.

The hub 50 may be rotatably disposed on the spindle 24. For instance, one or more wheel bearings may be mounted on spindle 24 and may rotatably support the hub 50. In FIG. 1, a first wheel bearing 60 and a second wheel bearing 62 are provided in a cavity 64 that is located between the spindle 24 and the hub 50. The first wheel bearing 60 may be disposed inboard or further from the second spindle end surface 42 than the second wheel bearing 62. As such, the hub 50 may be configured to rotate about the axis 30. In a drive axle configuration, the axle flange 32 may be coupled to the hub 50 with one or more fasteners 66. As such, the hub 50 may rotate with the axle shaft 22. In a non-drive axle configuration, the hub 50 may not be coupled to an axle shaft 22 or axle flange 32.

The brake subsystem 52 may be adapted to slow or inhibit rotation of at least one associated wheel 54. For example, the brake subsystem 52 may be configured as a friction brake, such as a drum brake or a disc brake. In FIG. 1, a portion of the brake subsystem 52 is shown with a drum brake configuration. In a drum brake configuration, a brake drum 70 may be fixedly disposed on the hub 50 with one or more fasteners 72, such as wheel lug studs. The brake drum 70 may extend continuously around brake shoe assemblies (not shown) that may be configured to engage the brake drum 70 to slow rotation of an associated wheel 54.

The wheel 54 may be fixedly disposed on the hub 50. For example, the wheel 54 may be mounted on the hub 50 via the fasteners 72. More specifically, the wheel 54 may have a wheel mounting flange 74 that may have a set of holes that may each receive a fastener 72. A lug nut 76 may be threaded onto each fastener to secure the wheel 54 to the fasteners 72 and the hub 50. The lug nut 76 may engage or may be disposed proximate an outboard side 78 of the wheel mounting flange 74 that may face away from the brake drum 70 or toward the axle flange 32. The wheel 54 may be configured to support the tire 56. The tire 56 may be a pneumatic tire that may be inflated with a pressurized gas or pressurized gas mixture.

A tire inflation system 80 may be associated with the wheel end assembly 26. The tire inflation system 80 may be disposed on the vehicle and may be configured to provide a pressurized gas or pressurized gas mixture to one or more tires 56. For clarity, the term "pressurized gas" may refer to either a pressurized gas or a pressurized gas mixture. The tire inflation system 80 may include a control system that may monitor and control the inflation of one or more tires 56, a pressurized gas source 82, and a gas supply subsystem 84.

The pressurized gas source 82 may be configured to supply or store a volume of a pressurized gas or pressurized gas mixture, like air or nitrogen. For example, the pressurized gas source 82 may be a tank and/or a pump like a compressor. The pressurized gas source 82 may be disposed on the vehicle and may provide a pressurized gas or pressurized gas mixture at a pressure that is greater than or equal to a desired inflation pressure of a tire 56. As such, the pressurized gas source 82 may inflate a tire or maintain a desired tire pressure.

The gas supply subsystem 84 may fluidly connect the pressurized gas source 82 to the tire 56. The gas supply subsystem 84 may include one or more conduits, such as a hose, tubing, pipe, or combinations thereof. In FIG. 1, a first conduit 90 and a second conduit 92 are shown. The first conduit 90 may be fluidly connected to and may receive pressurized gas from the pressurized gas source 82. The second conduit 92 may supply pressurized gas to the tire 56. In addition, one or more valves may be associated with or provided with a conduit to enable or disable the flow of the pressurized gas from the pressurized gas source 82 to one or more tires 56. The routing of the conduits between the pressurized gas source 82 and a tire 56 that is shown in FIG. 1 is exemplary and is not meant to be limiting as other conduit routing paths may be provided. The flow of pressurized gas is represented by the arrows located near the conduits in FIG. 1.

Figure 2:
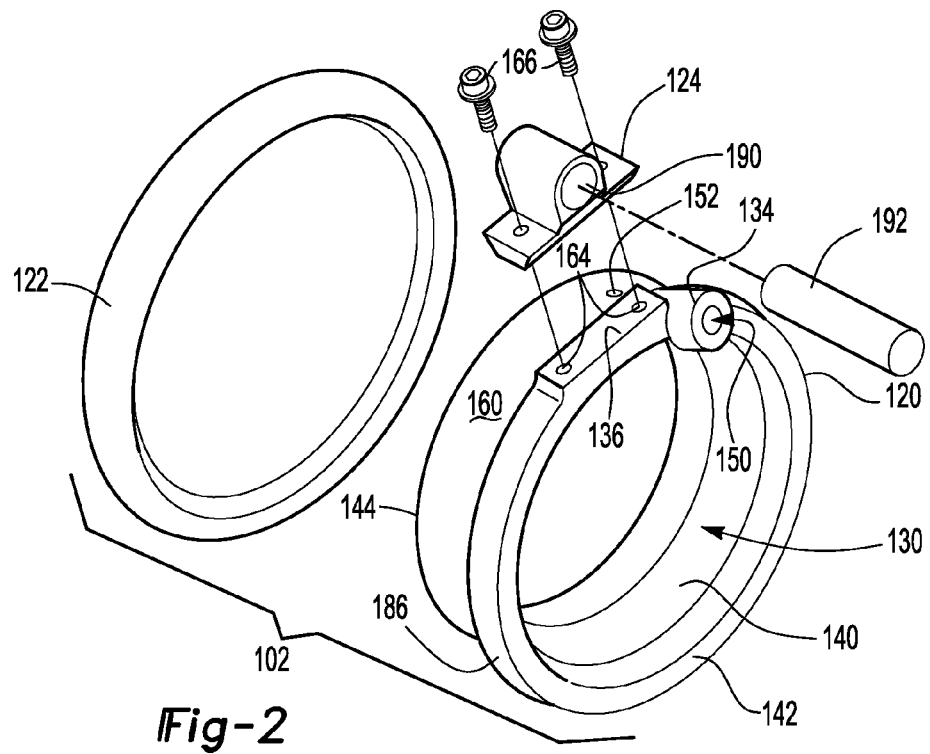
FIG. 2 is an exploded view of an exemplary sleeve assembly that may be provided with the tire inflation system.
Figure 3:
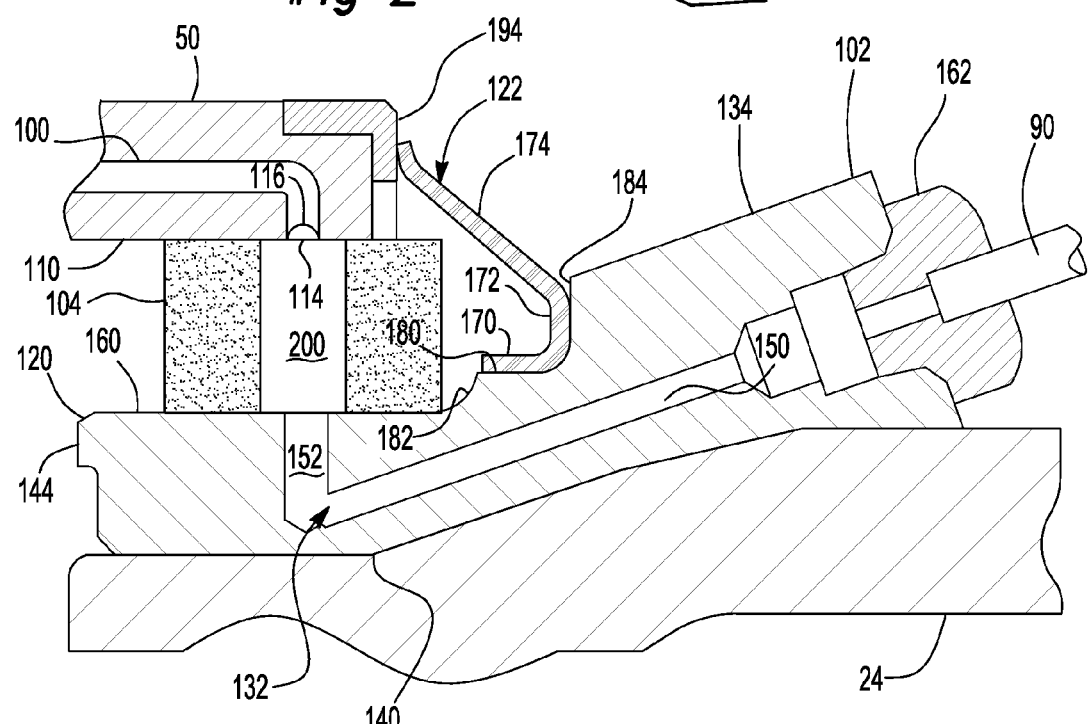
FIG. 3 is a magnified view of a portion of FIG. 1 proximate the sleeve assembly.

Referring to FIGS. 1-3, exemplary interfaces between the wheel end assembly 26 and the gas supply subsystem 84 are shown. As is best shown in FIGS. 1 and 3, the hub 50 may include a hub passage 100 for routing pressurized gas through the hub 50. A sleeve assembly 102 and a wheel end seal assembly 104 may be provided for fluidly connecting the pressurized gas source 82 to the hub passage 100.

Referring to FIGS. 1 and 3, the hub passage 100 may extend through the hub 50. The hub passage 100 or a portion thereof may extend substantially parallel to the axis 30 in one or more embodiments. The hub passage 100 may extend from a first hub surface 110 to a second hub surface 112.

The first hub surface 110 may be an exterior surface of the hub 50. For example, the first hub surface 110 may face toward the spindle 24 or may face inboard or away from the axle flange 32 depending on the configuration of the wheel end seal assembly 104. In addition, the first hub surface 110 may be disposed proximate and may engage the wheel end seal assembly 104. The first hub surface 110 may have a passage inlet 114 that may receive pressurized gas from the pressurized gas source 82 via the wheel end seal assembly 104. The passage inlet 114 may be part of the hub passage 100 and may include a passage inlet groove 116. The passage inlet groove 116, if provided, may face toward the wheel end seal assembly 104 and may extend continuously around the axis 30 in a ring-like manner. As such, the passage inlet groove 116 may receive pressurized gas from the wheel end seal assembly 104 as the hub 50 rotates about the axis 30 with respect to at least a portion of the wheel end seal assembly 104.

The second hub surface 112 may be an exterior surface of the hub 50 and may be spaced apart from the first hub surface 110. For example, the second hub surface 112 may be generally disposed on an opposite side of the hub 50 and/or the wheel mounting flange 74 from the first hub surface 110. Alternatively, the second hub surface 112 may be disposed directly opposite the first hub surface 110 in one or more embodiments. As shown in FIG. 1, the second hub surface 112 may have a hub passage outlet 118 that may be configured to provide pressurized gas to the tire 56. The hub passage outlet 118 may be part of the hub passage 100 and may be fluidly connected to the tire 56 by the second conduit 92. In at least one embodiment, the hub passage outlet 118 may be disposed between the outboard side 78 of the wheel mounting flange 74 and the axle flange 32. As such, the hub passage 100 may extend through the hub 50 to facilitate the routing of pressurized gas from one side of the wheel 54 to another, which may facilitate the supply of pressurized gas to a tire inflation valve that may be provided on an outboard side of the wheel end assembly 26. Alternatively, the hub passage outlet 118 may be disposed on an inboard side of the wheel end assembly 26 and a conduit may be routed through the wheel mounting flange 74 or a hollow fastener 72 like a hollow wheel stud to route pressurized gas to a tire inflation valve that may be provided on the outboard side of the wheel end assembly 26.

The sleeve assembly 102 may be disposed between the pressurized gas source 82 and the hub 50. More specifically, the sleeve assembly 102 may receive pressurized gas from the pressurized gas source 82 via a first conduit 90 and may fluidly connect the first conduit 90 to the hub passage 100 via the wheel end seal assembly 104. The sleeve assembly 102 may include a sleeve assembly seal 120, a deflector 122, and a mounting block 124.

The sleeve assembly seal 120 may have a ring-like configuration and may extend continuously around the spindle 24. Moreover, the sleeve assembly seal 120 may be fixedly positioned on the spindle 24, such as with an interference fit. As such, the sleeve assembly seal 120 may not rotate with respect to the spindle 24. In at least one embodiment, the sleeve assembly seal 120 may include a hole 130, a sleeve assembly passage 132, a fitting mounting boss 134, and a mounting pad 136.

The hole 130 may receive the spindle 24. The hole 130 may be at least partially defined by an inner surface 140 that may extend from a first end surface 142 to a second end surface 144. As such, the hole 130 may be a through hole through which the spindle 24 may extend.

The sleeve assembly passage 132 may be spaced apart from the hole 130. The sleeve assembly passage 132 may include a first portion 150 and a second portion 152.

The first portion 150 may be an inlet that may receive pressurized gas from the gas supply subsystem 84. The first portion 150 may extend through the fitting mounting boss 134 toward the second end surface 144. In at least one embodiment, the first portion 150 may extend toward the axis 30 and may be linear.

The second portion 152 may be an outlet that delivers pressurized gas to another component, such as the wheel end seal assembly 104. The second portion 152 may extend from the first portion 150 to the wheel end seal assembly 104. The second portion 152 may extend from an end of the first portion 150 to a first outer surface 160 of the sleeve assembly seal 120. The first outer surface 160 may be disposed opposite the inner surface 140 and may be an outside circumferential surface of the sleeve assembly seal 120. In addition, the first outer surface 160 may extend from the second end surface 144 toward the first end surface 142 in one or more embodiments. In at least one embodiment, the second portion 152 may extend from the first outer surface 160 toward the axis 30 or may be radially disposed with respect to the axis 30. The second portion 152 may be linear and may have a shorter length than the first portion 150.

The fitting mounting boss 134 may be disposed proximate and may protrude from the first end surface 142. The fitting mounting boss 134 may receive or may facilitate mounting of a fitting 162 that may couple the first conduit 90 to the sleeve assembly 102. At least a portion of the first portion 150 of the sleeve assembly passage 132 may extend through the fitting mounting boss 134.

The mounting pad 136, if provided, may facilitate mounting of the mounting block 124 to the sleeve assembly 102. The mounting pad 136 may be disposed proximate an exterior surface of the sleeve assembly seal 120. In the embodiment shown in FIG. 2, the mounting pad 136 is disposed proximate the first end surface 142 of the sleeve assembly seal 120. The mounting pad 136 may also include one or more holes 164 that may receive a fastener 166 that may couple the mounting block 124 to the mounting pad 136.

The deflector 122, if provided, may help shield the wheel end seal assembly 104 from contaminants. As such, the deflector 122 may help inhibit contaminants from entering the cavity 64. The deflector 122 may be spaced apart from the hub 50 and the wheel end seal assembly 104. The deflector 122 may have a ring-like configuration and may extend continuously around the sleeve assembly seal 120. The deflector 122 may be fixedly positioned on the sleeve assembly seal 120 and may be located between the first end surface 142 and the second end surface 144 or between the first conduit 90 and the wheel end seal assembly 104. In at least one embodiment, the deflector 122 may have a first wall 170, a second wall 172, and a third wall 174.

The first wall 170 may be configured to engage a surface of the sleeve assembly seal 120, such as a second outer surface 180. The second outer surface 180 may be disposed opposite the inner surface 140 and may be an outside circumferential surface of the sleeve assembly seal 120. In addition, the second outer surface 180 may be disposed between the first end surface 142 and the second end surface 144 and may be disposed further from the axis 30 than the first outer surface 160 in one or more embodiments. A first step surface 182 may extend from the first outer surface 160 to the second outer surface 180.

The second wall 172 may extend at an angle from an end of the first wall 170. The second wall 172 may engage a second step surface 184 to inhibit axial movement of the deflector 122. The second step surface 184 may extend from the second outer surface 180 to a third outer surface 186 and may be spaced apart from the first step surface 182.

The third wall 174 may extend from an end of the second wall 172. The third wall 174 may extend at an angle with respect to the axis 30 and toward the hub 50. The third wall 174 may be longer than the first wall 170 and/or the second wall 172. Moreover, a portion of the wheel end seal assembly 104 may be disposed between the third wall 174 and the sleeve assembly seal 120 to help shield the wheel end seal assembly 104.

The mounting block 124 may be disposed proximate an exterior surface of the sleeve assembly seal 120. In addition, the mounting block 124 may be spaced apart from the deflector 122. The mounting block 124 may be configured to engage and be mounted to the mounting pad 136. The mounting block 124 may be coupled to the sleeve assembly 102 in any suitable manner, such as with one or more fasteners 166. The mounting block 124 may facilitate mounting of a tone ring sensor. For example, the mounting block 124 may have a tone ring sensor hole 190 that may receive the tone ring sensor 192. The tone ring sensor hole 190 may be configured as a through hole through which at least a portion of the tone ring sensor 192 may extend.

The tone ring sensor 192 may be provided with an antilock brake system and may be configured to detect rotation of the hub 50 about the axis 30. For example, the tone ring sensor 192 may detect features that may be provided with or mounted to the hub 50. In FIG. 3, a tone ring 194 is provided with the hub 50. The tone ring 194 may have a plurality of openings that may be spaced apart from each other. The tone ring sensor 192 may detect the presence or absence of an opening in the tone ring 194 and may provide a corresponding signal that may be indicative of rotation of the hub 50 and wheel 54. As such, the tone ring openings may move past the tone ring sensor 192 when the hub 50 rotates about the axis 30.

The wheel end seal assembly 104 may be located between the sleeve assembly 102 and the hub 50. For instance, the wheel end seal assembly 104 may be disposed between and may engage the hub 50 and the sleeve assembly seal 120. The wheel end seal assembly 104 may be configured as a ring that may extend continuously around the sleeve assembly 102. As such, the wheel end seal assembly 104 may inhibit contaminants from entering the cavity 64 and may help retain lubricant in the cavity 64. In at least one embodiment, the wheel end seal assembly 104 may be fixedly disposed with respect to the hub 50 and may rotate about the axis 30 and with respect to the spindle 24.

The wheel end seal assembly 104 may include at least one seal passage 200 that may fluidly connect the sleeve assembly passage 132 to the hub passage 100. The seal passage 200 may receive pressurized gas from the sleeve assembly passage 132 and may route pressurized gas to the passage inlet 114 of the hub passage 100. Optionally, a seal groove may be provided with the wheel end seal assembly 104 that may face toward the hub 50 and may extend continuously around the axis 30 in a ring-like manner. As such, the seal groove may distribute pressurized gas around the axis 30 and facilitate the flow of pressurized gas to the hub passage 100 as the hub 50 rotates. The seal groove may be provided whether or not the hub 50 includes a passage inlet groove 116 or may be omitted when a passage inlet groove 116 is provided.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tire inflation system comprising:
a conduit that supplies a pressurized gas for inflating a tire;
a spindle disposed along an axis;
a hub that is disposed on the spindle and configured to rotate about the axis, wherein the hub has a hub passage that routes the pressurized gas through the hub;
a sleeve assembly that includes:
a sleeve assembly seal that has a hole that receives the spindle, a fitting mounting boss that facilitates mounting of the conduit, and a mounting pad that extends from the fitting mounting boss that facilitates mounting of a mounting block that receives a tone ring sensor that is configured to detect rotation of the hub about the axis, wherein the sleeve assembly seal has a sleeve assembly passage that receives the pressurized gas from the conduit; and
a deflector that is mounted on the sleeve assembly seal; and
a wheel end seal assembly that is disposed between the sleeve assembly seal and the hub, wherein the wheel end seal assembly has a seal passage that fluidly connects the sleeve assembly passage to the hub passage.

2. The tire inflation system of claim 1 wherein the deflector is fixedly disposed on the sleeve assembly seal between the conduit and the wheel end seal assembly.

3. The tire inflation system of claim 1 wherein the deflector is spaced apart from the hub and the wheel end seal assembly and extends continuously around the sleeve assembly seal.

4. The tire inflation system of claim 1 wherein the sleeve assembly seal has a first end surface disposed proximate the conduit, a second end surface disposed opposite the first end surface, and a first outer surface that extends from the second end surface toward the first end surface, wherein the wheel end seal assembly engages the first outer surface.

5. The tire inflation system of claim 4 wherein the fitting mounting boss is disposed proximate the first end surface and the conduit is disposed proximate the fitting mounting boss.

6. The tire inflation system of claim 5 wherein the sleeve assembly passage includes a first portion that receives the pressurized gas from the conduit and a second portion that extends from the first portion toward the first outer surface.

7. The tire inflation system of claim 6 wherein the first portion extends from the fitting mounting boss toward the second end surface.

8. The tire inflation system of claim 4 wherein the sleeve assembly seal has an inner surface that is disposed opposite the first outer surface and that engages the spindle, wherein the sleeve assembly passage is spaced apart from the inner surface.

9. A tire inflation system comprising:
a conduit that supplies a pressurized gas for inflating a tire;
a spindle disposed along an axis;
a hub that is disposed on the spindle and configured to rotate about the axis, wherein the hub has a hub passage that routes the pressurized gas through the hub;
a sleeve assembly that includes:
a sleeve assembly seal that has a hole that receives the spindle, wherein the sleeve assembly seal has a sleeve assembly passage that receives the pressurized gas from the conduit, an inner surface that engages the spindle, a first outer surface that is disposed opposite the inner surface, a second outer surface that is an outside circumferential surface of the sleeve assembly seal, and a second step surface that extends from the first outer surface to the second outer surface; and
a deflector that is mounted on the sleeve assembly seal, wherein the deflector has a first wall that engages the second outer surface, a second wall that extends from an end of the first wall and extends along the second step surface to inhibit axial movement of the deflector, and a third wall that extends from an end of the second wall toward the hub; and
a wheel end seal assembly that is disposed between the sleeve assembly seal and the hub, wherein the wheel end seal assembly has a seal passage that fluidly connects the sleeve assembly passage to the hub passage.

10. The tire inflation system of claim 9 wherein the hub passage has a hub passage outlet that is fluidly connected to the tire by way of a second conduit, wherein the tire is disposed on a wheel that is mounted to the hub.

11. The tire inflation system of claim 9 wherein the sleeve assembly does not rotate with respect to the spindle.

12. The tire inflation system of claim 9 wherein the sleeve assembly extends continuously around the spindle.

13. The tire inflation system of claim 9 wherein the wheel end seal assembly extends continuously around the sleeve assembly.

14. The tire inflation system of claim 9 wherein the hub extends continuously around the wheel end seal assembly.

15. The tire inflation system of claim 9 wherein the hub rotates with respect to the sleeve assembly.

16. The tire inflation system of claim 9 wherein the wheel end seal assembly engages the hub and the sleeve assembly.

17. The tire inflation system of claim 9 wherein the third wall extends to a tone ring that is disposed on the hub.

18. The tire inflation system of claim 9 wherein the sleeve assembly further comprises a mounting block that is disposed on the sleeve assembly seal, wherein the mounting block facilitates mounting of a tone ring sensor that is configured to detect rotation of the hub about the axis.

19. The tire inflation system of claim 18 wherein the mounting block is spaced apart from the deflector.

* * * * *